United States Patent
Miller et al.

(10) Patent No.: US 6,383,344 B1
(45) Date of Patent: May 7, 2002

(54) MOLECULAR WEIGHT REDUCTION OF POLYMER USING IRRADIATION TREATMENT

(75) Inventors: Robert J. Miller, Halifax; Aviva Shiedlin, Brookline, both of MA (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 09/619,369

(22) Filed: Jul. 19, 2000

(51) Int. Cl.[7] .................................................. C07F 1/00
(52) U.S. Cl. .............................. 204/157.6; 204/157.63; 204/157.82
(58) Field of Search ....................... 204/157.6, 157.63, 204/157.82

(56) References Cited

U.S. PATENT DOCUMENTS 2,895,891 A * 7/1959 Miller ......................... 204/154
4,987,222 A * 1/1991 De Ambrosi et al. ......... 536/21

FOREIGN PATENT DOCUMENTS

JP 7-48401 A * 2/1995

OTHER PUBLICATIONS

*abstracts only.*

* cited by examiner

*Primary Examiner*—Edna Wong
(74) *Attorney, Agent, or Firm*—Isabelle A. S. Blundell

(57) ABSTRACT

A method for reducing the molecular weight of polymer comprises subjecting a solid phase polymer to a dose of gamma irradiation sufficient to permit the desired molecular weight reduction to occur.

8 Claims, 6 Drawing Sheets

MOLECULAR WEIGHT REDUCTION OF POLYMER USING IRRADIATION TREATMENT

BACKGROUND OF THE INVENTION

This invention relates to methods for the controlled molecular weight reduction of polymers using specific amounts of high-energy irradiation, such as gamma irradiation. The methods of this invention permit the direct reduction of the molecular weight of such polymers to preselected lower molecular weight levels with low polydispersity. Polymers which are particularly suitable for use in the present invention include the polyanionic polysaccharides, and more particularly hyaluronic acid ("HA") and carboxymethyl cellulose ("CMC").

Hyaluronic acid is a linear long-chain polysaccharide comprising repeating D-glucuronate and N-acetylglucosamine disaccharide units. Hyaluronic acid is not species specific, and it may be obtained, for example, either by extraction from animal tissues, such as rooster combs and umbilical cords (Klein, J., & Meyer, F. A., 1983, Biochem. & Biophys. Acta, 755(3), 400–411), or by the removal of hyaluronic acid capsular material form bacterial species, e.g. Streptococcus (Van Brunt, J., 1986, Biotechnology, 4, 780–782). Hyaluronic acid from such sources exists as a mixture of different molecular weight species, and the overall molecular weight of the product is expressed as a weight average molecular weight.

Hyaluronic acid has a variety of therapeutic applications, such as its use in ophthalmic surgery and for post-operative adhesion prevention, as well as having potential uses in a number of other areas. The key to many of the uses of hyaluronic acid lies in its hydrodynamic properties (Van Brunt, J., 1986, Biotechnology, 4, 780–782), which produces highly viscous solutions at low concentrations. The viscosity of a hyaluronic acid solution is primarily dependent on the molecular weight, and the concentration of hyaluronic acid in solution.

The viscosity properties may be altered by the dilution of the polymer, but in many applications this approach is not acceptable because a specific concentration of the polymer is required for particular applications. Proposed strategies to produce hyaluronic acid having a variety of preselected molecular weights include the selection of bacterial mutants capable of producing the desired hyaluronic acid molecular weight range, or the alteration of the physiological conditions during growth of a bacterium to enhance the production of a particular molecular weight range. However, neither of these techniques provides both the range and diversity of molecular weight species required for specific applications due to the inherent limitations of these methods.

Alternatively, the reduction of high molecular weight hyaluronic acid to moieties of lower molecular weight may be achieved by enzymatic, chemical or physical means. Enzymatic methods of degrading hyaluronic acid are known, (Hamai, A., et al, 1989, Agric. Biol. Chem., 53 (8), 2163–2168), but are relatively uncontrollable and tend to broaden the hyaluronic acid molecular weight distribution and therefore increase the polydispersity of the material. This makes the material particularly unsuitable for certain applications where highly defined molecular weight ranges are required. Chemical methods (Harris, M. J., et al, 1972, JACS, 94, 7570–7572), suffer similar problems and, moreover, may result in residual concentrations of the reacting chemicals remaining in a therapeutic product. Fractionation of hyaluronic acid into defined molecular weight species is feasible (Armand, G., & Reyes, M., 1983, Biochem. & Biophys. Res. Comm., 112(1), 168–175), but this is a complex operation which is not easily controllable in large scale manufacturing operations.

U.S. Pat. No. 5,491,227 describes a method for the molecular weight reduction of polysaccharides, such as hyaluronic acid, carboxymethyl cellulose and guar gum, by subjecting the polymers to pressure homogenization in a single pass through the device at pressures ranging from 10 Mpa to 25 Mpa. The hyaluronic acid product obtained as a result of the pressure homogenization has an average molecular weight of from about 1.2 to about $1.5 \times 10^6$D, based upon an initial molecular weight of $1 \times 10^7$D to $2 \times 10^7$D. One potential shortcoming of this method is that it requires the polymer, in this case hyaluronic acid, to be processed in the solution phase. This requires the additional processing step of solidification and drying of the polymer so if, as is typically the case, a powdered product is desired. In addition, some polymers may not be amenable to being readily solubilized, and since this method requires a rather precise measurement of apparent viscosities, this can present processing problems.

The use of irradiation, such as gamma irradiation, to sterilize polymers and non-polymeric materials is known. It is also known that certain types of irradiation can be used to initiate polymerization reactions in certain polymers, and for the addition or substitution of certain pendant groups onto a polymer chain.

European Patent Application No. 269937 describes a process for the controlled preparation of low molecular weight glucosaminoglycans by treating the corresponding high molecular weight glucosaminoglycans with rectilinear gamma radiation at doses within the range of 2.5 to 20 Mrad. The glucosaminoglycans which can be used in this process include heparin, chondroitin sulphate, keratan sulphate and hyaluronic acid, with heparin being the preferred glucosaminoglycan. The gamma radiation is supplied in successive irradiation stages, followed by intervening cooling steps to prevent alteration of the molecular structure of the heparin. The reference is directed to low molecular weight heparin molecules that are reduced to fragments which are claimed to still possess biological activity.

It will be appreciated that it would be desirable to develop an improved process for the molecular weight reduction of high molecular weight polymers, such as hyaluronic acid and carboxymethyl cellulose, to preselected lower values without the necessity of additional purification or other processing steps required in conventional approaches.

SUMMARY OF THE INVENTION

The present invention features a method for the reduction in the molecular weight of high molecular weight polymers to substantially lower, preselected levels. The method of this invention comprises subjecting the high molecular weight polymer to a dose of irradiation sufficient to achieve the desired degree of molecular weight reduction. The present method is applied to the polymer in the solid phase, thereby eliminating the necessity of preparing a polymer solution. The use of polymer solutions requires a solubility step which is difficult to perform for some polymers because of their limited solubility and/or the high viscosity of the solutions. The present method also avoids the expense and trouble of solidifying the polymer after the proper molecular weight has been achieved. Using the method of this invention, the molecular weight of polymers can be reduced directly in a controlled and reproducible manner, without the use of chemicals or enzymes that must be subsequently neutralized or removed.

The type and dosage of the irradiation that can be employed in the practice of this invention will vary depending on the type of polymer treated, the degree of molecular weight reduction desired, and the form of the polymer, i.e. whether the polymer is in the form of a salt. The preferred type of irradiation is gamma irradiation, although other types of irradiation, including heat sources, such as microwave irradiation, can also be used. Typically, the dosage of irradiation used will vary from about 1 kGy to about 120 kGy.

In one embodiment, the polymer which can be treated according to the method of this invention is a polysaccharide polymer, preferably hyaluronic acid with an initial molecular weight in the range of from about 3,000 kdaltons to about 1,000 kdaltons. In another embodiment, the polysaccharide polymer is carboxymethyl cellulose with an initial molecular weight in the ranger of from about 300 kdaltons to about 100 kdaltons.

The process of this invention does not require the use of additional processing steps in order to avoid structural changes to the polymer, or to remove impurities which may have been introduced into the polymer preparation as a direct result of the polymer processing.

Unless defined otherwise, all technical and scientific terms used herein have the same meaning as commonly understood by one of ordinary skill in the art to which this invention pertains. Although any method and materials similar or equivalent to those described herein can be used in the practice or testing of the present invention, the preferred methods and materials are now described. All publications mentioned hereunder, including published patent applications, and issued or granted patents, are incorporated by reference herein. Unless mentioned otherwise, the techniques employed or contemplated herein are standard methodologies well known to one of ordinary skill in the art. The materials, methods and examples are illustrative only and not intended to be limiting.

Other features and advantages of the invention will be apparent from the following detailed description, and from the claims.

DETAILED DESCRIPTION

Figure 1:
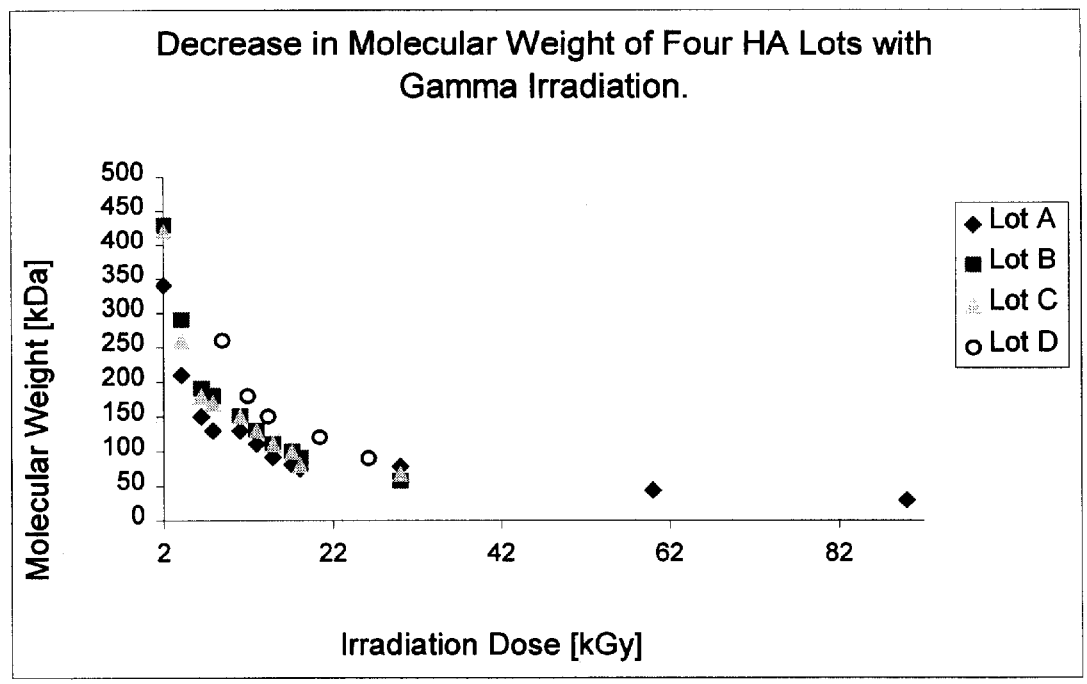
FIG. 1 is a graph illustrating the decrease in molecular weight of four (4) samples of a hyaluronic acid preparation after exposure to gamma irradiation.

The present invention provides a method for the molecular weight reduction of high molecular weight polymers to lower molecular weight polymers based on the discovery that the irradiation dose can be correlated with precision to the final molecular weight of the polymer.

As used herein, the term "high molecular weight" will depend on the type of polymer used in the method, but will generally denote molecular weights in excess of about 100 kdaltons. A "high molecular weight" hyaluronic acid polymer will typically have a molecular weight in the range of from about 1,000 kdaltons to about 3,000 kdaltons. A "high molecular weight" carboxymethyl cellulose polymer, in contrast, will typically have a molecular weight in the range of from about 100 kdaltons to about 300 kdaltons.

The type and amount of irradiation used is dependent on the particular polymer species which is processed according to the invention. The method of this invention is applicable to a wide variety of polymers, but it is particularly applicable to the polyanionic polysaccharides, and most preferably to hyaluronic acid and carboxymethyl cellulose. As used herein, and unless otherwise indicated, the term "polyanionic polysaccharide" denotes a polysaccharide containing more than one negatively charged group, e.g., carboxyl groups at pH values above about pH 4.0. This includes hyaluronic acid ("HA"), any of its hyaluronate salts, including, for example, sodium hyaluronate (the sodium salt), potassium hyaluronate, magnesium hyaluronate, and calcium hyaluronate, carboxymethylcellulose ("CMC"), and mixtures of hyaluronic acid and carboxymethylcellulose ("HA/CMC").

The polymer treated according to this invention is in the solid phase prior to and during treatment. The term "solid phase" includes powders, granules, flakes, particles, and the like, but excluding bulk solid forms such as bars, pellets, extruded shapes, and the like. The irradiation is applied directly to the polymer in the solid phase, and no solution is required. This avoids the necessity of using cooling steps between irradiation treatments, and the necessity of purifying the polymer after treatment.

The effect of irradiation dose on product molecular weight for hyaluronic acid and carboxymethyl cellulose are shown in FIGS. 1, 2, 3 and 4, respectively. These Figures show that molecular weights decrease linearly with the natural log of the dose of gamma irradiation. The starting molecular weight of the polymer influences the final molecular weight only at low doses (i.e. up to 30 kGy), as shown in these Figures. This characteristic permits the calculation of the precise amount of irradiation required in order to achieve a preselected final polymer molecular weight based on the known starting molecular weight of the polymer. This type of linear relationship can be developed for a wide variety of polymers of interest, including hyaluronic acid and carboxymethyl cellulose.

The following examples of this aspect of the invention are given by way of illustration and are not intended to limit the invention except as set forth in the appended claims. As shown in the examples, weight average molecular weights ("MW") and polydispersity index ("PI") were measured using Size Exclusion Chromatography coupled to Multiangle Laser Light Scattering ("SEC/MALLS"). PI is defined as the ratio between weight average molecular weight and number average molecular weight ($M_w/M_n$), and is an accepted measure of the breadth of the molecular weight distribution.

EXAMPLE 1

This example illustrates the effect of gamma irradiation on hyaluronic acid powder.

Figure 2:
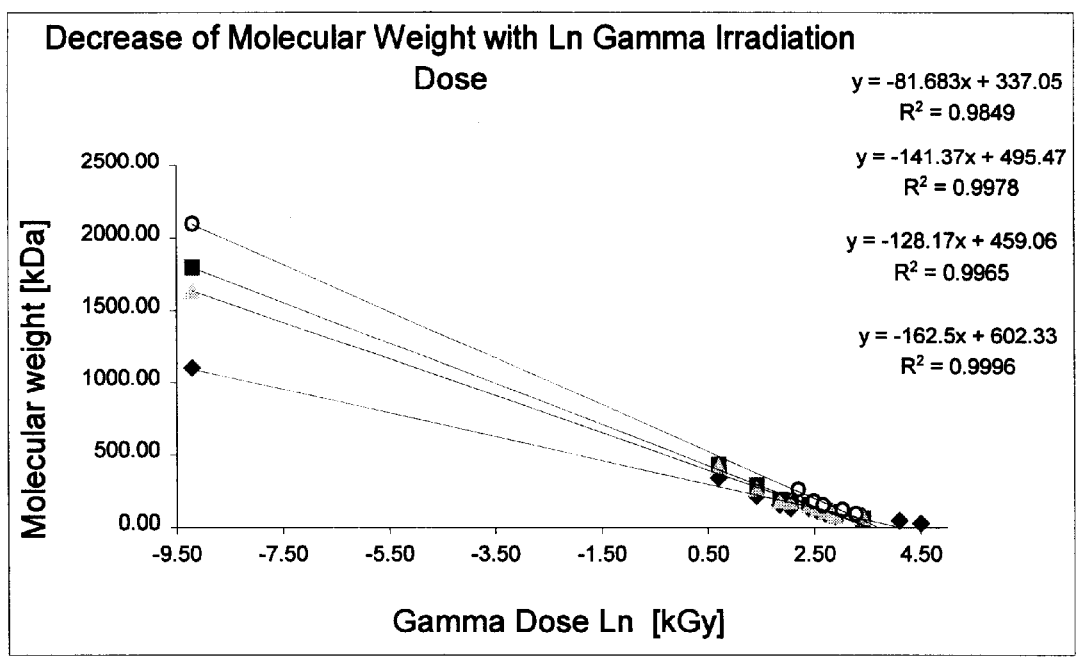
FIG. 2 is a graph illustrating the decrease in molecular weight of four (4) samples of a hyaluronic acid preparation as a function of the log of gamma irradiation dose.

Four (4) lots (Lots A, B, C and D) of medical grade hyaluronic acid powder were subjected to successive doses of gamma irradiation as shown in Table 1 below and in FIGS. 1 and 2. Table 1 shows the effects of the irradiation treatment on the weight average molecular weight (MW) and (PI) of the hyaluronic acid tested. FIGS. 1 and 2 illustrate the dependency of the molecular weight on irradiation treatment. The correlation coefficient from linear regression analysis of ($R^2$) of 0.99 is also shown. This data indicates that irradiation dose can be used to predict final molecular weight.

TABLE I

| Energy Dose [kGy] | Lot A HA MW [kdaltons] | Lot A PI (Mw/Mn) | Lot B HA MW [kdaltons] | Lot B PI (Mw/Mn) | Lot C HA MW [kdaltons] | Lot C PI (Mw/Mn) | Lot D HA MW [kdaltons] | Lot D PI (Mw/Mn) |
|---|---|---|---|---|---|---|---|---|
| 0 | 1640 | 1.1 | 1800 | 1.2 | 1100 | 1.3 | 2100 | 1.1 |
| 2.0 | 420 | 1.2 | 430 | 1.2 | 340 | 1.2 | | |
| 4.1 | 260 | 1.2 | 290 | 1.2 | 210 | 1.2 | | |
| 6.4 | 180 | 1.2 | 190 | 1.2 | 150 | 1.2 | | |
| 7.8 | 170 | 1.2 | 180 | 1.1 | 130 | 1.1 | | |
| 8.9 | | | | | | | 260 | 1.2 |
| 11.0 | 130 | 1.2 | 150 | 1.1 | 130 | 1.1 | | |
| 11.9 | | | | | | | 180 | 1.1 |
| 12.9 | 150 | 1.2 | 130 | 1.1 | 110 | 1.1 | | |
| 14.3 | | | | | | | 150 | 1.1 |
| 14.9 | 110 | 1.1 | 110 | 1.1 | 92 | 1.1 | | |
| 17.1 | 100 | 1.1 | 100 | 1.1 | 81 | 1.1 | | |
| 18.1 | 80 | 1.2 | 90 | 1.1 | 75 | 1.1 | | |
| 20.4 | | | | | | | 120 | 1.1 |
| 26.2 | | | | | | | 90 | 1.1 |
| 30.0 | 78 | | | | | | | |
| 60.0 | 44 | | | | | | | |
| 90.0 | 29 | | | | | | | |

EXAMPLE 2

This example illustrates that the technique is predictable, reproducible, and controllable.

One lot of medical grade hyaluronic acid powder was subjected to the same dose of gamma irradiation on three different occasions. The MW and PI of the hyaluronic acid were found to be identical in all three cases.

TABLE 2

| Energy Dose [kGy] | HA MW [kdaltons] | PI (Mw/Mn) |
|---|---|---|
| 5.5–6.4 | 190 | 1.1 |
| 5.6–6.4 | 190 | 1.1 |
| 6.3–6.4 | 180 | 1.2 |

EXAMPLE 3

This example illustrates the absence of a side reaction from the high-energy irradiation of hyaluronic acid such as the deacylation of the acetyl groups in N-acetylglucosamine.

Residual free amine was measured in aqueous solutions of various hyaluronic acid samples by derivatization of any free amine with fluorescamine. The relative fluorescence of the depolymerized samples was compared to the starting hyaluronic acid, and the results are shown in Table 3 below.

TABLE 3

| Energy Dose [kGy] | % Free Amines [moles] |
|---|---|
| 0 | 0.013 |
| 2 | 0.016 |
| 7.8 | 0.024 |
| 15 | 0.033 |
| 18.1 | 0.037 |
| 30 | 0.054 |

A significant increase in the relative fluorescence in the depolymerized hyaluronic acid samples would be indicative of an increased free amine content of the samples. As shown in Table 3, the increase in the free amine content is negligible.

EXAMPLE 4

This example illustrates the effect of gamma irradiation on carboxymethyl cellulose powder.

Figure 3:
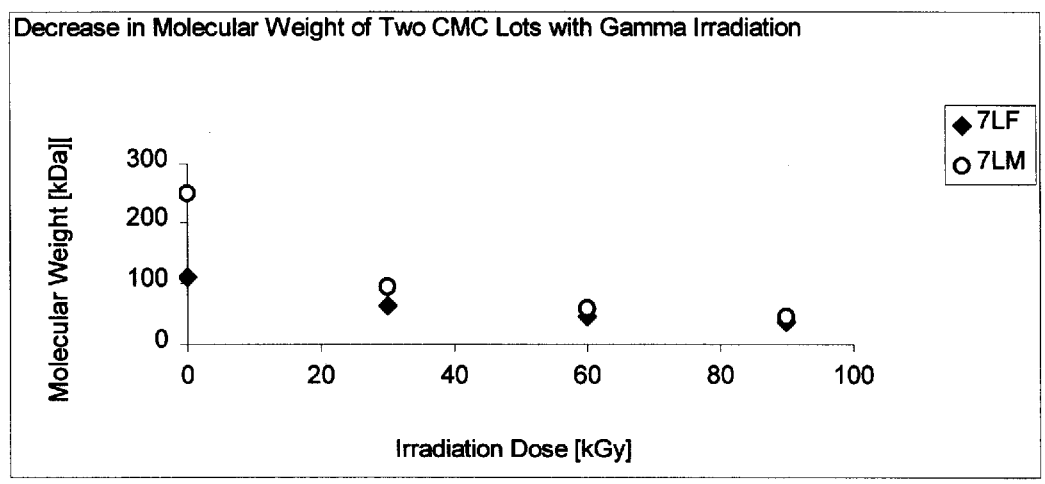
FIG. 3 is a graph illustrating the decrease in molecular weight of two (2) samples of a preparation of a carboxymethyl cellulose preparation after exposure to gamma irradiation.
Figure 4:
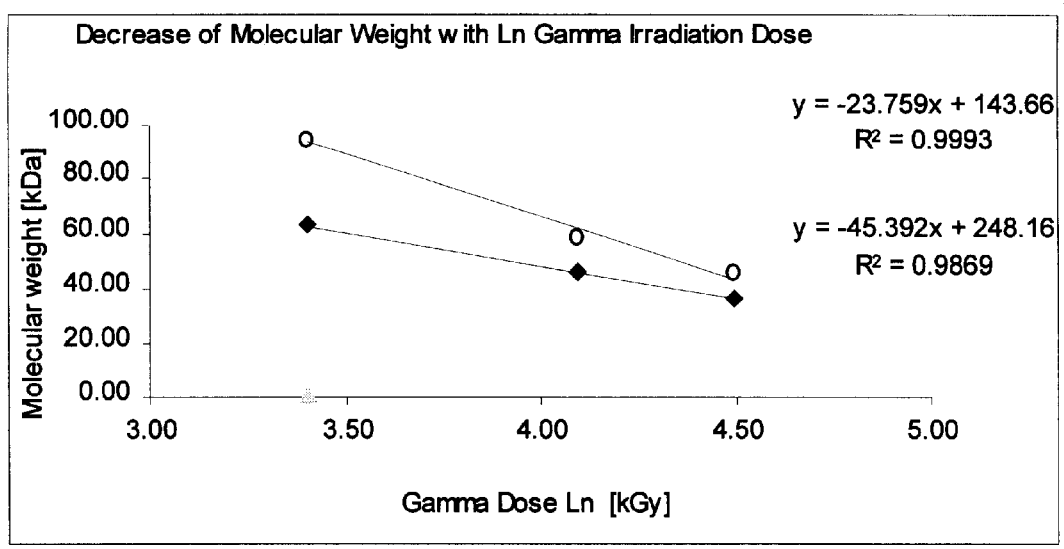
FIG. 4 is a graph illustrating the decrease in molecular weight of two (2) samples of a carboxymethyl cellulose preparation as a function of the log of gamma irradiation dose.

Two (2) lots (Lots A and B) of commercial grade carboxymethyl cellulose powder (Aqualon), with different molecular weights, were subjected to successive doses of high energy irradiation as shown in Table 4 below and FIGS. 3 and 4.

Table 4 shows the effects of the irradiation treatment on the average molecular weight of the carboxymethyl cellulose tested. FIGS. 3 and 4 illustrate the dependency of molecular weight and irradiation. A correlation coefficient from linear regression analysis of ($R^2$) of 0.99 is shown. This indicates that irradiation dose can be used to predict final molecular weight

TABLE 4

| Energy Dose [kGy] | Lot A CMC MW [kdaltons] | Lot A PI (Mw/Mn) | Lot B CMC MW [kdaltons] | Lot B PI (Mw/Mn) |
|---|---|---|---|---|
| 0 | 110 | 2 | 250 | 2 |
| 30 | 63 | 2.2 | 95 | 2 |
| 60 | 46 | 2.2 | 59 | 2.5 |
| 90 | 37 | 2.3 | 46 | 2.3 |

EXAMPLE 5

This example is intended to determine whether there have been any gross changes in the functional groups, such as intact amide and carboxyl groups, which are contained on the hyaluronic acid and carboxymethyl cellulose molecules.

Figure 5:
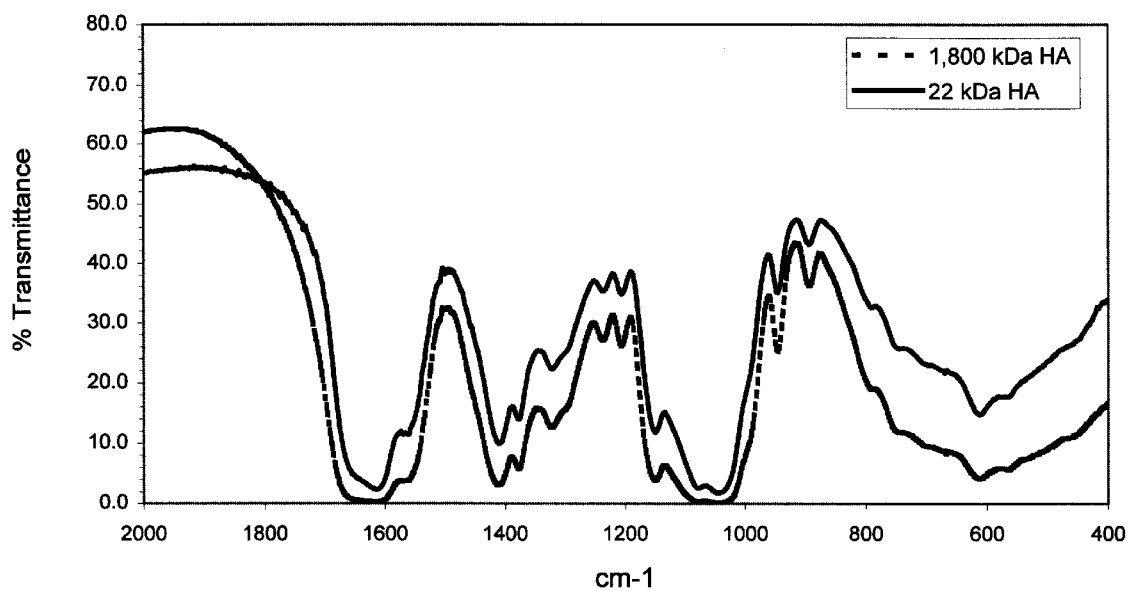
FIG. 5 is an FTIR spectrum of a hyaluronic acid powder sample before and after treatment with 90 kGy of gamma irradiation.
Figure 6:
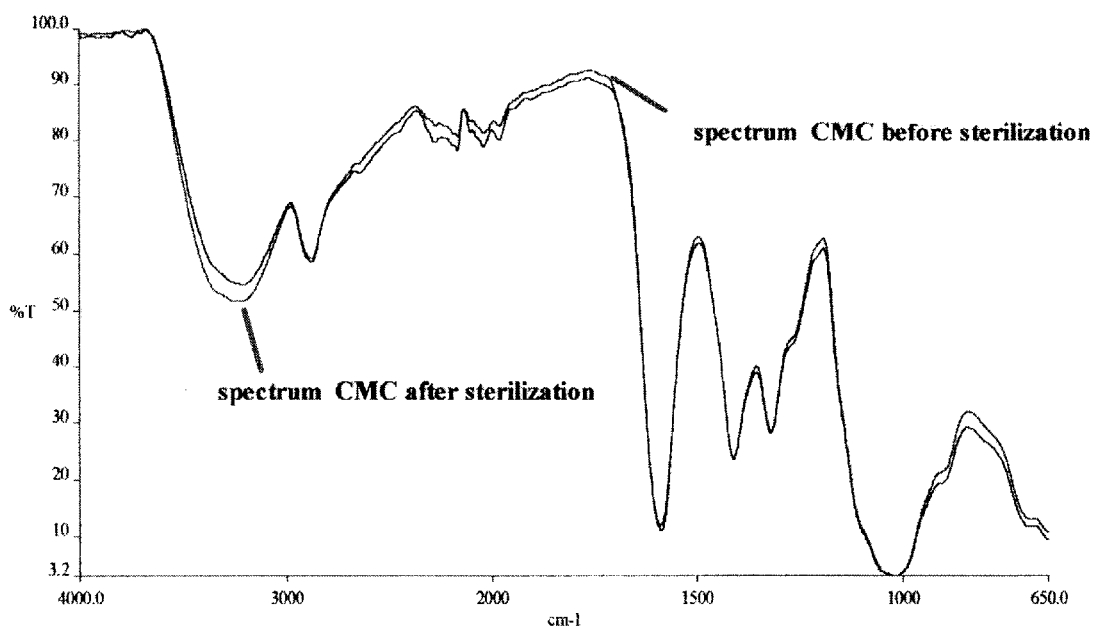
FIG. 6 is an FTIR spectrum of a carboxymethyl cellulose powder sample before and after treatment with 90 kGy of gamma irradiation.

Transmission FT/IR spectra was used to identify and monitor chemical changes. Spectra of carbohydrates before and after irradiation treatment were taken and compared. The results are shown in FIGS. 5 and 6 for hyaluronic acid and carboxymethyl cellulose, respectively. There are no gross chemical changes in either hyaluronic acid or carboxymethyl cellulose after gamma irradiation as compared to the non-irradiated polymer.

From the above description, one skilled in the art can easily ascertain the essential characteristics of the present invention, and without departing from the spirit and scope thereof, can make various changes and modifications of the invention to adapt it to various usages and conditions. As one skilled in the art will appreciate, the pharmaceutical preparations of the invention can be made using protocols which are within the method of the invention yet are different in particulars from those described herein.

What is claimed is:

1. A method for the controlled molecular weight reduction of a high molecular weight polymer consisting of the steps of:
   selecting a polymer having an initial molecular weight which exceeds a preselected lower molecular weight, said polymer being in the solid phase, and
   subjecting the polymer to irradiation in a dosage amount sufficient to reduce the molecular weight of the polymer to the preselected lower molecular weight to thereby obtain a substantially pure polymer product having a desired molecular weight.

2. The method of claim 1 wherein the polymer is in powder form.

3. The method of claim 1 wherein the polymer is a polysaccharide polymer.

4. The method of claim 3 wherein the polymer is hyaluronic acid.

5. The method of claim 3 wherein the polymer is carboxymethyl cellulose.

6. The method of claim 1 wherein the molecular structure of the polymer is intact after reducing the molecular weight of the polymer.

7. The method of claim 1 wherein the irradiation used is gamma irradiation.

8. The method of claim 7 wherein the dosage level of the gamma irradiation is from about 1 kGy to about 120 kGy.

* * * * *